United States Patent
Sasaoka et al.

[19]

[11] Patent Number: 6,157,754
[45] Date of Patent: Dec. 5, 2000

[54] OPTICAL TRANSMISSION LINE

[75] Inventors: Eisuke Sasaoka; Takatoshi Kato, both of Yokohama, Japan

[73] Assignee: Sumitomo Electric Industries, Ltd., Osaka, Japan

[21] Appl. No.: 09/075,324

[22] Filed: May 11, 1998

[30] Foreign Application Priority Data

May 9, 1997 [JP] Japan .................................. 9-119710

[51] Int. Cl.⁷ ....................................................... G02B 6/28
[52] U.S. Cl. ................................. 385/24; 385/31; 385/27; 385/122; 385/123; 359/159
[58] Field of Search ................................ 385/24, 123, 31, 385/38, 50, 122, 128, 124, 125, 126; 359/159, 109, 115, 124, 152, 153, 180, 189

[56] References Cited

U.S. PATENT DOCUMENTS

| | | | |
|---|---|---|---|
| 5,191,631 | 3/1993 | Rosenberg | 385/123 |
| 5,737,460 | 4/1998 | Damen et al. | 385/24 |
| 5,781,673 | 7/1998 | Reed et al. | 385/24 |

FOREIGN PATENT DOCUMENTS

| | | |
|---|---|---|
| 724 171 | 7/1996 | European Pat. Off. . |
| 0790510 | 8/1997 | European Pat. Off. . |
| 6-85757 | 3/1994 | Japan . |
| 08084135 | 3/1996 | Japan . |
| 8-248251 | 9/1996 | Japan . |
| 8-304655 | 11/1996 | Japan . |
| 08331049 | 12/1996 | Japan . |
| 09023187 | 1/1997 | Japan . |
| 09116489 | 5/1997 | Japan . |

*Primary Examiner*—Phan T. H. Palmer
*Attorney, Agent, or Firm*—Pillsbury Madison & Sutro, LLP

[57] ABSTRACT

The present invention relates to an optical transmission line, applicable to Wave Division Multiplexing (WDM) transmission, having a structure for restraining optical transmission characteristics from deteriorating due to each of the occurrence of nonlinear optical phenomena and the wavelength dispersion. This optical transmission line comprises, at least, a first optical fiber having, as characteristics at the predetermined operating wavelength, a first effective area and a first dispersion slope; and a second optical fiber having, as characteristics at the predetermined operating wavelength, a second effective area smaller than the first effective area and a second dispersion slope smaller than the first dispersion slope. In particular, the second optical fiber contributes to suppressing the deterioration in its optical transmission characteristics in the whole optical transmission line.

39 Claims, 6 Drawing Sheets

OPTICAL TRANSMISSION LINE

BACKGROUND OF THE INVENTION

1. Field of the Invention

The present invention relates to an optical transmission line suitable for long-haul transmission and large-capacity transmission of signal light.

2. Related Background Art

Optical transmission lines constituted by optical fibers have conventionally been used for large-capacity high-speed communications such as image communications, and long-haul communications such as international communications, while there are demands for larger capacity and longer distance. In order to achieve larger capacity wavelength division multiplex (WDM) transmission is employed, in which a plurality of wavelengths of signal light are multiplexed. To increase transmission distance, on the other hand, intervals between repeaters in optical fiber networks are increased, while the optical amplification factor in each repeater is enhanced, thus allowing the signal light outputted from the repeater to increase its power such that it reaches the repeater in the next stage with a sufficient power.

Meanwhile, it has been known in general that, when light propagates through a medium, a nonlinear optical phenomenon occurs. This nonlinear optical phenomenon includes, for example, self-phase modulation (SPM), four-wave mixing (FWM), cross-phase modulation (XPM), nonlinear scattering, or the like, and becomes greater as the optical energy density per unit volume is higher in the medium. Accordingly, when the optical amplification factor in a repeater is enhanced in order to cover a longer distance in an optical fiber transmission line, such a nonlinear optical phenomenon would increase as well. When a nonlinear optical phenomenon occurs in the optical transmission line, signal light deteriorates, whereby reception errors are likely to occur in its receiving station.

Hence, several proposals have been made in order to solve such problems. For example, Japanese Patent Application Laid-Open No. 6-85757 discloses a technique in which two optical fibers having effective areas different from each other and wavelength dispersions different from each other are cascaded to each other so as to constitute an optical transmission line, thereby reducing the deterioration in its optical transmission characteristics caused by the occurrence of nonlinear optical phenomena and the wavelength dispersion. Also, Japanese Patent Application Laid-Open No. 8-248251 discloses a technique which uses a dispersion-shifted optical fiber having an effective area $\geq Nm^2$, which is greater than that of the usual dispersion-shifted optical fiber, thereby reducing the deterioration in its optical transmission characteristics caused by the occurrence of nonlinear optical phenomena. Further, Japanese Patent Application Laid-Open No. 8-304655 discloses a technique which uses a dispersion-shifted optical fiber having a wavelength dispersion slope of (0.05 ps/nm$^2$/km) smaller than that of the usual dispersion-shifted optical fiber, thereby reducing the deterioration in its optical transmission characteristics caused by the occurrence of nonlinear optical phenomena.

SUMMARY OF THE INVENTION

Having studied the foregoing background art, the inventors have found the following problems. In the techniques disclosed in Documents 1 and 2, the effective area of the optical fiber is increased, so that the optical energy of signal light per unit volume is reduced, thereby lowering the deterioration in its optical transmission characteristics caused by the occurrence of nonlinear optical phenomena. Due to the dispersion slope of the optical fiber in the employed wavelength band, however, its wavelength dispersion value varies depending on the wavelength of signal light. Accordingly, in the case of WDM transmission, even when the deterioration in its optical transmission characteristics caused by wavelength dispersion is reduced for a certain wavelength of signal light, such a deterioration can not be negligible for the other wavelengths of signal light. As a result, these techniques can not be employed in WDM transmission.

In the technique disclosed in Document 3, since the dispersion slope in the employed wavelength band is made small, even in the case of WDM transmission, the difference in wavelength dispersion occurring between wavelengths of signal light is small, whereby the deterioration in its optical transmission characteristics caused by wavelength dispersion can be reduced. Nevertheless, since the effective area of the optical fiber is not taken into account at all, this technique fails to overcome the deterioration in its optical transmission characteristics caused by the occurrence of nonlinear optical phenomena.

Accordingly, it is an object of the present invention to provide an optical transmission line, applicable to WDM transmission, having a structure designed to limit deterioration of optical transmission characteristics due to of the occurrence of nonlinear optical phenomena and wavelength dispersion.

In order to achieve the above-mentioned object, the optical transmission line according to the present invention comprises a first optical fiber and a second optical fiber optically connected to the first optical fiber so as to let in the signal light that has propagated through the first optical fiber. At least one signal light exists in a predetermined wavelength band. A predetermined operating wavelength can be defined by a wavelength of one signal light, the center wavelength of a region between a maximum wavelength and a minimum wavelength out of the plurality of signal lights, the center wavelength of the predetermined wavelength band, or the like. For example, when a 1.55-μm wavelength band is the predetermined wavelength as a region in use and the plurality of signal lights are included in the range of 1,500 nm to 1,600 nm (namely, 1.55-μm wavelength band), the predetermined operating wavelength can be set at 1,550 nm as the center wavelength of the 1.55-μm wavelength band.

In particular, the first optical fiber has, as characteristics at a predetermined operating wavelength, a first effective area and a first dispersion slope; while the second optical fiber has, as characteristics at the predetermined operating wavelength, a second effective area smaller than the first effective area and a second dispersion slope smaller than the first dispersion slope. Preferably, the second dispersion slope is not greater than ½ of the first dispersion slope.

In this optical transmission line, even when the signal light transmitted through the first optical fiber has a high power, the deterioration in its optical transmission characteristics caused by wavelength dispersion is effectively reduced since the first effective area is large. Also, since the signal light propagates through the second optical fiber after propagating through the first optical fiber reduces its power while propagating through the first optical fiber, the deterioration in its optical transmission characteristics caused by wavelength dispersion is reduced even though the second effective area is small. Namely, the signal light incident on the first optical fiber has a power greater than the signal light incident on the second optical fiber. Accordingly, the deterioration in its optical transmission characteristics caused by wavelength dispersion is effectively reduced in the whole optical transmission line.

In this specification, as indicated in Japanese Patent Application Laid-Open No. 8-248251, for example, the effective area ($A_{eff}$) of an optical fiber is given by the following expression:

$$A_{eff} = 2\pi (\int_0^\infty E^2 r\, dr)^2 / (\int_0^\infty E^4 r\, dr)$$

wherein E is an electric field accompanying the propagating signal light, and r is a radial distance from the fiber center.

Since the dispersion slope of the optical transmission line as a whole is the weighted mean of the first and second dispersion slopes in terms of length, it is smaller than that in the configuration employing the first optical fiber alone, whereby the deterioration in its optical transmission characteristics caused by wavelength dispersion is reduced as well. Namely, the second optical fiber functions such that the dispersion slope at the predetermined operating wavelength of the whole optical transmission line becomes smaller than the first dispersion slope. More specifically, it is preferred that the dispersion slope of the optical transmission line is not greater than 90% of the first dispersion slope.

In this specification, the dispersion slope refers to the gradient of a dispersion curve indicating wavelength dependence of wavelength dispersion.

Preferably, in the optical transmission line according to the present invention, the absolute value of wavelength dispersion in the optical transmission line as a whole at the predetermined operating wavelength is not greater than 5 ps/nm/km. Also, the first and second optical fiber each preferably have a wavelength dispersion whose absolute value is not greater than 5 ps/nm/km at the predetermined operating wavelength.

In the foregoing configuration, the optical transmission line is disposed, at least, between a light source and a receiver, between a light source and a repeater, between repeaters, or between a repeater and a receiver.

The optical transmission line according to the present invention can further comprise a third optical fiber optically connected to the second optical fiber so as to let in the signal light that has propagated through the second optical fiber in order to enable bidirectional optical transmission. In this configuration, the third optical fiber has, as characteristics at the predetermined operating wavelength, a third effective area larger than the second effective area and a third dispersion slope greater than the second dispersion slope.

Thus, in the case where the signal light successively propagates through the first, second, and third optical fibers in this order, the deterioration in its optical transmission characteristics of the whole optical transmission line is effectively suppressed due to the configuration of first and second optical fibers. In the case where the signal light successively propagates through the third, second, and first optical fibers in this order, on the other hand, the deterioration in its optical transmission characteristics of the whole optical transmission line is effectively suppressed due to the configuration of third and second optical fibers.

In this configuration, the optical transmission line is disposed, at least, between first and second stations each including a light source and a receiver, between the first station and a repeater, between repeaters, or between a repeater and the second station.

Further, the optical transmission line according to the present invention can be configured such that a plurality of optical fibers are disposed, at least, between a light source and a receiver, between a light source and a repeater, between repeaters, or between a repeater and a receiver. In this configuration, one of a pair of optical fibers selected from the plurality of optical fibers has, as characteristics at the predetermined operating wavelength, a first effective area and a first dispersion slope; while the other (disposed downstream the one optical fiber) of the pair of optical fibers selected from the plurality of optical fibers has, as characteristics at the predetermined operating wavelength, a second effective area smaller than the first effective area and a second dispersion slope smaller than the first dispersion slope.

In other words, the optical transmission line according to the present invention can be configured such that, at least three optical fibers having a greater dispersion slope as their effective area is larger are substantially cascaded to each other in order of decreasing effective area, and the signal light successively propagates therethrough from the larger effective area side to the smaller effective area side. In this optical transmission line, since the signal light successively propagatea from the optical fiber having a greater effective area and dispersion slope to the optical fiber having a smaller effective area and dispersion slope, the deterioration in its optical transmission characteristics caused by each of the occurrence of nonlinear optical phenomena and the wavelength dispersion is reduced. Further, in this case, since the effective areas and dispersion slopes of the predetermined number of cascaded optical fibers are changed stepwise, structural dissociation of optical fibers at each optical fiber connecting point can be reduced, thereby allowing the connection loss in the whole optical transmission line to decrease.

Further, the optical transmission line according to the present invention can be configured such that the absolute value of wavelength dispersion as a whole is not greater than 5 ps/nm/km in the predetermined operating wavelength. In this case, the wavelength dispersion of the whole optical transmission line becomes sufficiently small so that the deterioration in its optical transmission characteristics caused by wavelength dispersion can be sufficiently lowered.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other, without their overlapping descriptions being repeated.

In describing the embodiments, the following terms will be used wavelength dispersion, dispersion slope, and effective area.

In the case where an optical pulse having a single wavelength is made incident on one end of an optical fiber and propagates therethrough, the optical pulse reaching the other end of the optical fiber would broaden its pulse time width and collapse its form. It is due to the fact that signal light emitted from its light source, even with a single wavelength, actually has a spectral width, and that propagation speed in the optical fiber varies depending on wavelength. The spread of pulse time width (unit: ps) per unit spectral width (unit: nm) of optical pulse per unit length of optical fiber (unit: km) is referred to as wavelength dispersion (unit: ps/nm/km). The gradient of the dispersion curve indicating the wavelength dependence of this wavelength dispersion is referred to as dispersion slope (unit: ps/nm$^2$/km).

In the case where the optical fiber is a single-mode optical fiber, its wavelength dispersion is the sum of its material dispersion (dispersion caused by the wavelength dependence of the refractive index inherent in the material of the optical fiber) and structural dispersion (dispersion caused by the wavelength dependence of the group velocity of propagating light). Since the material of the optical fiber is silica glass in general, the material dispersion is a value within a predetermined range. On the other hand, the structural dispersion greatly depends on a structural parameter (refractive index profile) of the optical fiber.

The optical energy of the light propagating through an optical fiber does not travel only through the core region of the optical fiber but also propagates through its cladding region. The effective area, which is determined in view of the transverse mode distribution, indicates an effective area concerning nonlinear optical phenomena in the optical fiber.

First Embodiment

Figure 1:
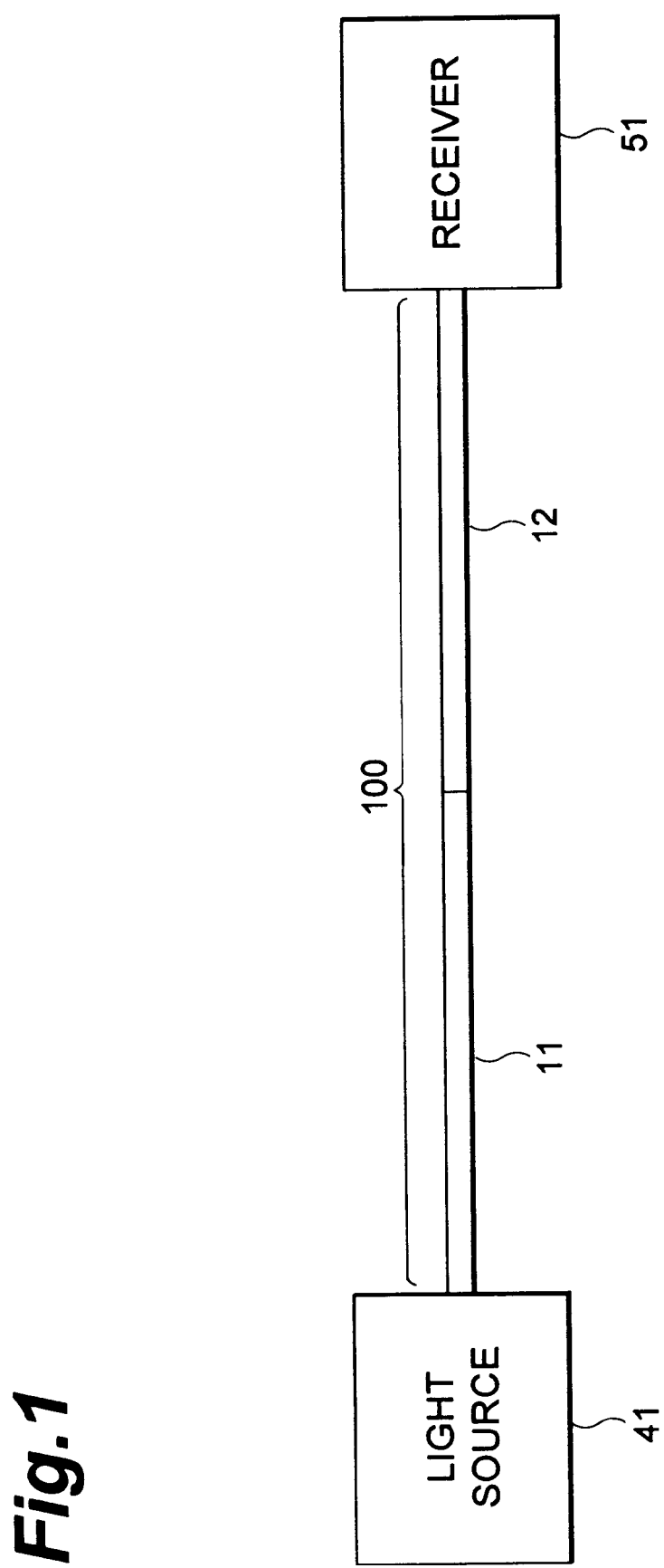
FIG. 1 is a view showing the configuration of a first embodiment of the optical transmission line according to the present invention.

In the following, the first embodiment of the optical transmission line according to the present invention will be explained. FIG. 1 is a configurational view of an optical transmission line 100 according to the first embodiment.

The optical transmission line 100 according to the first embodiment is configured such that one end of an optical fiber 11 and one end of an optical fiber 12 are connected to each other. Connected to the other end of the optical fiber 11 is a light source (e.g., semiconductor laser light source) 41 for emitting signal light. Connected to the other end of the optical fiber 12 is a receiver (e.g., receiver including a photodiode as a light-receiving device) 51 for receiving the signal light. The optical fibers 11 and 12 can be connected to each other either by fusion or by way of a connector. The signal light emitted from the light source 41 propagates through the optical fiber 11 and then through the optical fiber 12, and reaches the receiver 51 so as to be received thereby.

Here, the effective area of the front-end optical fiber 11 is greater than that of the back-end optical fiber 12. As a consequence, when the signal light emitted from the light source 41 propagates through the optical fiber 11 even with a high power, the optical energy of the signal light per unit volume becomes smaller due to the large effective area of the optical fiber 11, thus reducing the deterioration in its optical transmission characteristics caused by the occurrence of nonlinear optical phenomena. The effective area of the back-end optical fiber 12 is smaller than that of the front-end optical fiber 11. However since the signal light is made incident on and propagates through the optical fiber 12 after its power is lowered to a certain extent when propagating through the optical fiber 11, the optical energy per unit area in the optical fiber 12 is also small. Deterioration in its optical transmission characteristics caused by the occurrence of nonlinear optical phenomena is therefore reduced. As a result of the foregoing, in the whole optical transmission line 100 in which the optical fibers 11 and 12 are cascaded to each other, the deterioration in its optical transmission characteristics caused by the occurrence of nonlinear optical phenomena is lowered.

Also, at the center wavelength, 1,550 nm, in the wavelength band in use (1,500 nm to 1,600 nm), the dispersion slope of the front-end optical fiber 11 is greater than that of the back-end optical fiber 12. Though the dispersion slope of the optical fiber 11 must be made greater due to its enhanced effective area, the dispersion slope of the optical fiber 12 can be made smaller since its effective area is smaller than that of the optical fiber 11. The dispersion slope of the whole optical transmission line 100, in which the optical fibers 11 and 12 are cascaded to each other, is the weighted mean value of the respective dispersion slopes of the optical fibers 11 and 12 in terms of their lengths, thus being smaller than the dispersion slope of the optical transmission line made of the optical fiber 11 alone. The optical fiber 12 contributes to lowering the dispersion slope of the whole optical transmission line 100. Specifically, it is preferred that the dispersion slope of the whole optical transmission line 100 be not greater than 90% of that of the front-end optical fiber 11. The same is true with wavelength dispersion.

Preferably, the dispersion slope of the optical fiber 12 is not greater than ½ that of the optical fiber 11. In this case, the dispersion slope of the whole optical transmission line 100 can be sufficiently decreased. Preferably, the absolute value of wavelength dispersion of the whole transmission line 100 is not greater than 5 ps/nm/km. In this case the wavelength dispersion of the whole optical transmission line 100 can be sufficiently reduced, thus allowing the deterioration in its optical transmission characteristics caused by wavelength dispersion to sufficiently decrease. More preferably, the absolute value of wavelength in each of the optical fibers 11 and 12 is not greater than 5 ps/nm/km.

Thus configured optical transmission line 100 can suppress influence of the deterioration in its optical transmission characteristics caused by nonlinear optical phenomena and wavelength dispersion, and allow the signal light emitted from the light source 41 to reach the receiver 51.

In the following, results of an experiment will be explained. At the signal light wavelength of 1,550 nm, values of effective area, dispersion slope, wavelength dispersion, and length in the optical fibers 11 and 12 were set as shown in the following Table 1. This table also shows the experimentally obtained values of dispersion slope and wavelength dispersion of the whole optical transmission line 100 in which the optical fibers 11 and 12 were cascaded to each other.

TABLE 1

|  | Fiber 11 | Fiber 12 | Whole line |
|---|---|---|---|
| Effective Area ($\mu m^2$) | 80 | 20 | — |
| Dispersion Slope (ps/nm$^2$/km) | 0.11 | 0.01 | 0.06 |
| Wavelength Dispersion (ps/nm/km) | −2.0 | −1.8 | −1.9 |
| Length (km) | 30 | 30 | — |

As shown in this table, both effective area and dispersion slope are greater in the optical fiber 11 than in the optical fiber 12. The dispersion slope of the whole optical transmission line 100 is the weighted mean value of the respective dispersion slopes of the optical fibers 11 and 12 in terms of their lengths, whereas the wavelength dispersion of the whole optical transmission line 100 is the weighted mean value of the respective wavelength dispersions of the optical fibers 11 and 12 in terms of their lengths. Accordingly, the deterioration in its optical transmission characteristics in the whole optical transmission line 100 caused by wavelength dispersion has been reduced as compared with the case where the optical transmission line is made of the optical fiber 11 alone. In particular, the dispersion slope of the optical fiber 12 is not greater than ½ that of the optical fiber 11. The absolute value of wavelength dispersion in each of the optical fibers 11 and 12 is not greater than 5 ps/nm/km. The dispersion slope of the whole optical transmission line is not greater than 90% of the dispersion slope of the optical fiber 11, from which it can be seen that the optical fiber 12 contributes to lowering the dispersion slope of the whole optical transmission line.

The transmission loss in the front-end optical fiber 11 is 0.20 dB/km, whereby the power of the signal light transmitted through 30 km of the optical fiber 11 decreases by 6 dB. Accordingly, when the signal light propagates through the optical fiber 11 even with a high power, the deterioration in its optical transmission characteristics caused by the occurrence of nonlinear optical phenomena is reduced since the optical fiber 11 has a large effective area. On the other hand, when the signal light propagates through the optical fiber 12, though it has a small core cross-sectional area, the deterioration in its optical transmission characteristics caused by the occurrence of nonlinear optical phenomena is reduced since the power of the signal light is low. As a result, it has been confirmed that the deterioration in its optical transmission characteristics caused by the occurrence of nonlinear optical phenomena is small in the optical transmission line 100 as a whole.

Figure 2A:
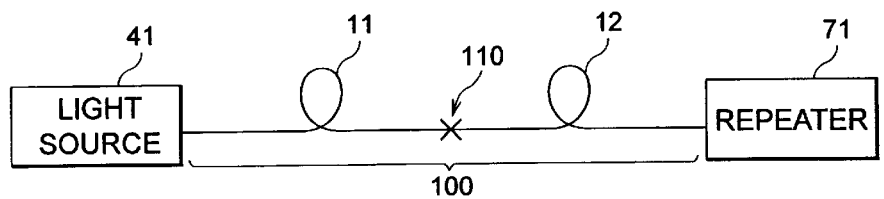
FIGS. 2A to 2D are views showing configurations of modified examples of the first embodiment of the optical transmission line according to the present invention.
Figure 2B:
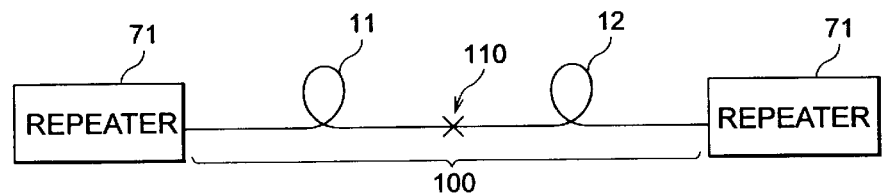
Figure 2C:
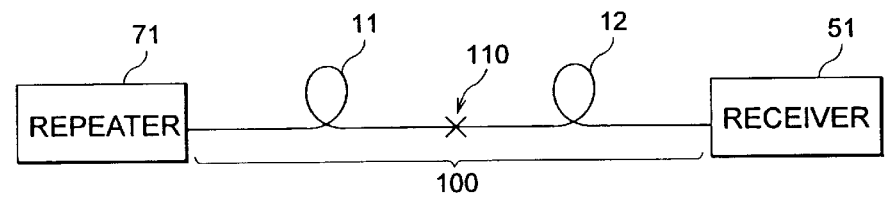

The optical transmission line 100 according to the first embodiment is not necessarily disposed between the light source 41 and the receiver 51. Similar effects can also be obtained when the optical transmission line 100 is disposed between the light source 41 and a repeater 71 such as optical amplifier as shown in FIG. 2A, between repeaters 71 as shown in FIG. 2B, or between the repeater 71 and the receiver 51 as shown in FIG. 2C.

At a connecting point 110 of the optical fibers 11 and 12, the optical fibers 11 and 12 can be connected to each other either by fusion or by way of a connector.

Figure 2D:
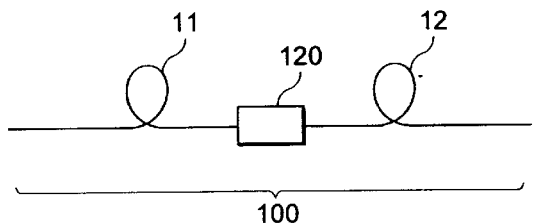

As long as the power of the signal light entered into the optical fiber 11 is greater than the power of the signal light entered into the optical fiber 12, similar effects can also be obtained in a configuration in which an optical device 120 having an optical amplification function is disposed between the optical fibers 11 and 12 as shown in FIG. 2D.

Second Embodiment

Figure 3:
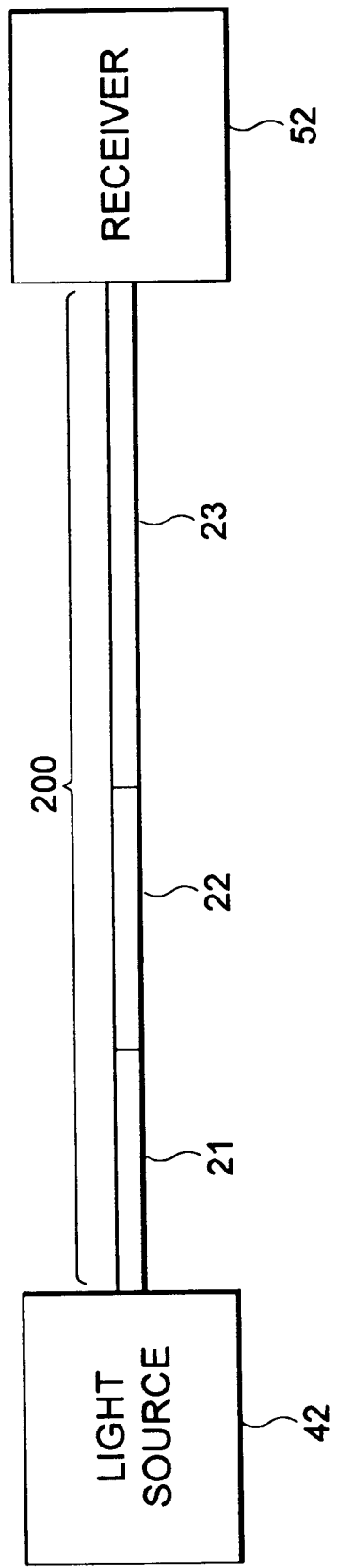
FIG. 3 is a view showing the configuration of a second embodiment of the optical transmission line according to the present invention.

In the following, the second embodiment of the optical transmission line according to the present invention will be explained. FIG. 3 is a configurational view of an optical transmission line 200 according to the second embodiment.

The optical transmission line 200 according to the second embodiment is configured such that optical fibers 21, 22, and 23 are cascaded to each other in this order. Connected to the free end of the optical fiber 21 is a light source 42 for emitting signal light. Connected to the free end of the optical fiber 23 is a receiver 52 for receiving the signal light. The optical fibers 21 to 23 can be connected to each other either by fusion or by way of a connector. The signal light emitted from the light source 42 successively propagates through the optical fibers 21, 22, and 23, and reaches the receiver 52 so as to be received thereby.

Here, the respective effective areas of the optical fibers 21, 22, and 23 decrease in this order. As a consequence, when the signal light emitted from the light source 42 propagates through the optical fiber 21 even with a high power, the optical energy of the signal light per unit volume becomes smaller due to the large effective area of the optical fiber 21, thus reducing the deterioration in its optical transmission characteristics caused by the occurrence of nonlinear optical phenomena. Though the effective area of the next-stage optical fiber 22 is smaller than that of the optical fiber 21, since the signal light propagates through the optical fiber 22 after its power is lowered to a certain extent when propagating through the optical fiber 21, the optical energy per unit area in the optical fiber 22 is also small, thus reducing the deterioration in its optical transmission characteristics caused by the occurrence of nonlinear optical phenomena as well. Though the effective area of the back-end optical fiber 23 is smaller than that of the optical fiber 22, since the signal light propagates through the optical fiber 23 after its power is further lowered, the optical energy per unit area in the optical fiber 23 is also small, thus reducing the deterioration in its optical transmission characteristics caused by the occurrence of nonlinear optical phenomena. As a result of the foregoing, in the whole optical transmission line 200 in which the optical fibers 21 to 23 are cascaded to each other, the deterioration in its optical transmission characteristics caused by the occurrence of nonlinear optical phenomena is lowered.

Also, at the center wavelength, 1,550 nm, in the wavelength band in use (1,500 nm to 1,600 nm), the respective dispersion slopes of the optical fibers 21, 22, and 23 decrease in this order. Namely, though the dispersion slope of the optical fiber 21 must be made greater due to its enhanced effective area, the dispersion slope of the optical fiber 22 can be made smaller since its effective area is smaller than that of the optical fiber 21. The dispersion slope of the optical fiber 23 can be further lowered. The dispersion slope of the whole optical transmission line 200, in which the optical fibers 21 to 23 are cascaded to each other, is the weighted mean value of the respective dispersion slopes of the optical fibers 21 to 23 in terms of their lengths, thus being smaller than the dispersion slope of the optical transmission line made of the optical fiber 21 alone. Namely, the optical fibers 22 and 23 contribute to lowering the dispersion slope of the whole optical transmission line 200. Specifically, it is preferred that the dispersion slope of the whole optical transmission line 200 be not greater than 90% of that of the optical fiber 21. The same is true with wavelength dispersion.

Thus configured optical transmission line 200 can suppress influence of the deterioration in its optical transmission characteristics caused by each of the occurrence of nonlinear optical phenomena and the wavelength dispersion, and allow the signal light emitted from the light source 42 to reach the receiver 52. Further, since the optical transmission line 200 according to the second embodiment is configured such that the effective areas and dispersion slopes of the respective optical fibers 21 and 23 are changed stepwise by way of the optical fiber 21, at each of the connecting point between the optical fibers 21 and 22 and the connecting point between the optical fibers 22 and 23 can be reduced, which results in a reduction of the connection loss as the whole optical transmission line.

In the following, results of an experiment will be explained. At the signal light wavelength of 1,550 nm, values of effective area, dispersion slope, wavelength dispersion, and length in the optical fibers 21 to 23 were set as shown in the following Table 2. This table also shows the experimentally obtained values of dispersion slope and wavelength dispersion of the whole optical transmission line 200 in which the optical fibers 21 to 23 were cascaded to each other.

TABLE 2

|  | Fiber 21 | Fiber 22 | Fiber 23 | Whole line |
|---|---|---|---|---|
| Effective Area ($\mu m^2$) | 80 | 50 | 20 | — |
| Dispersion Slope ($ps/nm^2/km$) | 0.11 | 0.08 | 0.01 | 0.05 |
| Wavelength Dispersion ($ps/nm/km$) | -2.0 | -2.1 | -1.8 | -1.9 |
| Length (km) | 10 | 20 | 30 | — |

As shown in this table, both effective areas and dispersion slopes in the respective optical fibers 21 to 23 decrease in this order. The dispersion slope of the whole optical transmission line 200 is the weighted mean value of the respective dispersion slopes of the optical fibers 21 to 23 in terms of their lengths, whereas the wavelength dispersion of the whole optical transmission line 200 is the weighted mean value of the respective wavelength dispersions of the optical fibers 21 to 23 in terms of their lengths. Accordingly, the deterioration in its optical transmission characteristics in the whole optical transmission line 200 caused by wavelength dispersion has been reduced as compared with the case where the optical transmission line is made of the optical fiber 21 alone. In particular, the absolute value of wavelength dispersion in each of the optical fibers 21, 22, and 23 is not greater than 5 ps/nm/km.

The transmission loss in the front-end optical fiber 21 is 0.20 dB/km, whereby the power of the signal light transmitted through 10 km of the optical fiber 21 decreases by 2 dB. The transmission loss in the next-stage optical fiber 21 is also 0.20 dB/km, whereby the power of the signal light transmitted through 20 km of the optical fiber 22 further decreases by 4 dB. Accordingly, when the signal light propagates through the optical fiber 21 even with a high power, the deterioration in its optical transmission characteristics caused by the occurrence of nonlinear optical phenomena is reduced since the optical fiber 21 has a large effective area. On the other hand, when the signal light propagates through the optical fiber 22, though it has a small core cross-sectional area, the deterioration in its optical transmission characteristics caused by the occurrence of nonlinear optical phenomena is reduced since the power of the signal light is low. Further, when the signal light propagates through the optical fiber 23, though its effective area is smaller, the deterioration in its optical transmission characteristics caused by the occurrence of nonlinear optical phenomena is reduced since the power of the signal light is lower. Also, it has been confirmed that the deterioration in its optical transmission characteristics caused by the occurrence of nonlinear optical phenomena is small in the optical transmission line 200 as a whole.

Figure 4A:
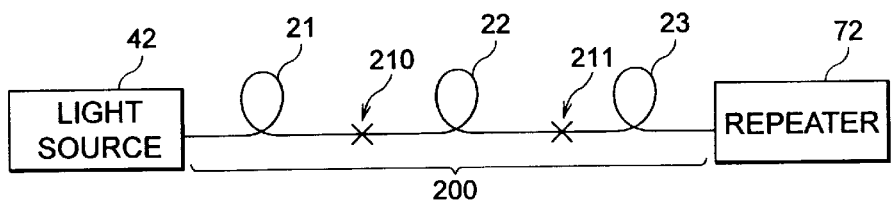
FIGS. 4A to 4D are views showing configurations of modified examples of the second embodiment of the optical transmission line according to the present invention.
Figure 4B:
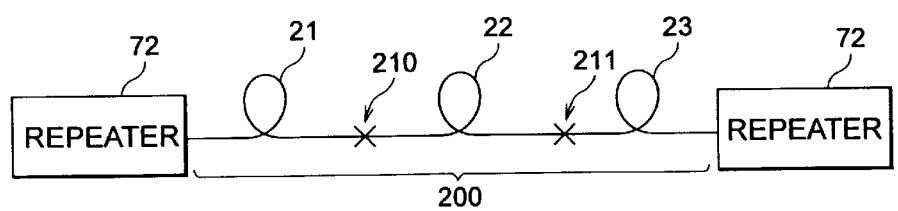
Figure 4C:
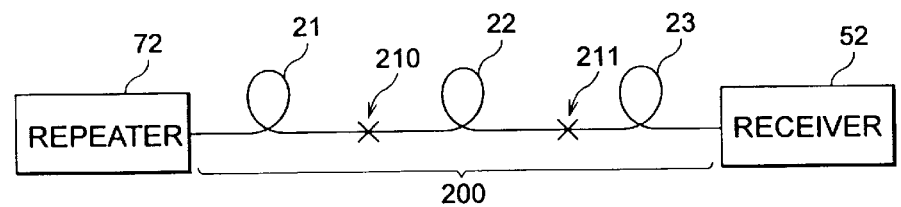

The optical transmission line 200 according to the second embodiment is not necessarily disposed between the light source 42 and the receiver 52. Similar effects can also be obtained when the optical transmission line 200 is disposed between the light source 42 and a repeater 72 such as optical amplifier as shown in FIG. 4A, between repeaters 72 as shown in FIG. 4B, or between the repeater 72 and the receiver 52 as shown in FIG. 4C.

At a connecting point 210 of the optical fibers 21 and 22, and at a connecting point 211 of the optical fibers 22 and 23, the optical fibers 21, 22, and 23 can be connected to each other either by fusion or by way of a connector.

Figure 4D:
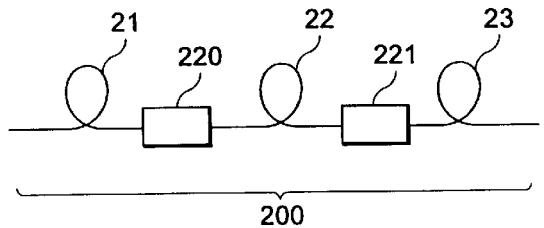

As long as the power of the signal light entered into the optical fiber 21 is greater than the power of the signal light entered into the optical fiber 22, similar effects can also be obtained in a configuration in which an optical device 220 having an optical amplification function is disposed between the optical fibers 21 and 22 as shown in FIG. 4D. Also, as long as the power of the signal light entered into the optical fiber 22 is greater than the power of the signal light entered into the optical fiber 23, it is possible to realize a configuration in which an optical device 221 having an optical amplification function is disposed between the optical fibers 22 and 23.

Third Embodiment

Figure 5:
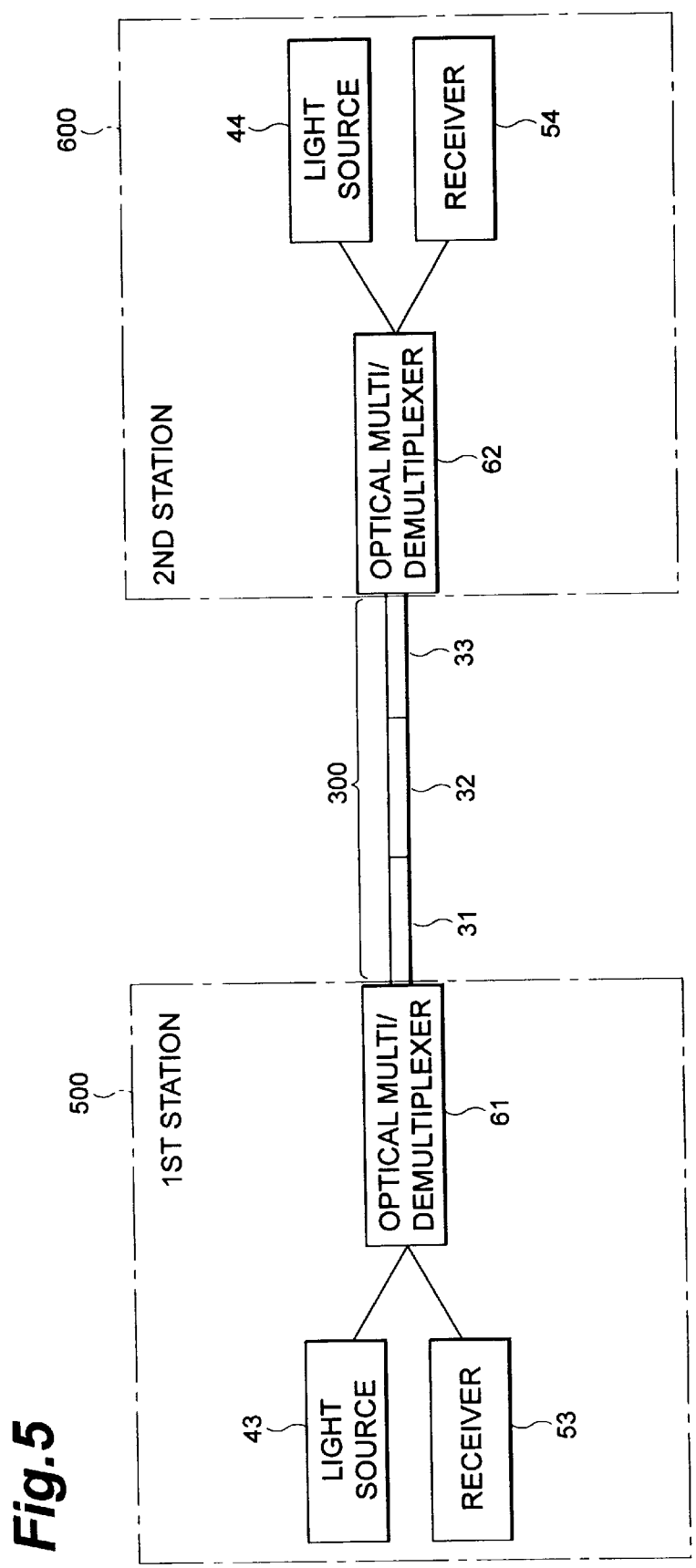
FIG. 5 is a view showing the configuration of a third embodiment of the optical transmission line according to the present invention.

In the following, the third embodiment of the optical transmission line according to the present invention will be explained. FIG. 5 is a configurational view of an optical transmission line 300 according to the third embodiment.

The optical transmission line 300 according to the third embodiment is configured such that optical fibers 31, 32, and 33 are cascaded to each other in this order. Connected to the free end of the optical fiber 31 by way of an optical multi/demultiplexer 61 are a light source 43 and a receiver 53. Connected to the free end of the optical fiber 33 by way of an optical multi/demultiplexer 62 are a light source 44 and a receiver 54. The optical fibers 31 to 33 can be connected to each other either by fusion or by way of a connector. The light source 43, receiver 53, and optical multi/demultiplexer 61 constitute a first station 500, whereas the light source 44, receiver 54, and optical multi/demultiplexer 62 constitute a second station 600.

The optical transmission line 300 according to the third embodiment has a configuration for enabling bidirectional optical communications. The signal light emitted from the light source 43, by way of the optical multi/demultiplexer 61, successively propagates through the optical fibers 31, 32, and 33, and then is, by way of the multi/demultiplexer 62, received by the receiver 54. On the other hand, the signal light emitted from the light source 44, by way of the optical multi/demultiplexer 62, successively propagates through the optical fibers 33, 32, and 31, and then is, by way of the multi/demultiplexer 61, received by the receiver 53.

Here, the effective area of each of the optical fibers 31 and 33 is larger than the effective area of the optical fiber 32. As a consequence, when the signal light emitted from the light source 43 propagates through the optical fiber 31 even with a high power, the optical energy of the signal light per unit volume becomes smaller due to the large effective area of the optical fiber 31, thus reducing the deterioration in its optical transmission characteristics caused by the occurrence of nonlinear optical phenomena. Though the effective area of the next-stage optical fiber 32 is smaller than that of the optical fiber 31, since the signal light propagates through the optical fiber 32 after its power is lowered to a certain extent when propagating through the optical fiber 31, the optical energy per unit area in the optical fiber 32 is also small, thus reducing the deterioration in its optical transmission characteristics caused by the occurrence of nonlinear optical phenomena as well. Since the signal light propagates through the optical fiber 33 after its power is further lowered, the optical energy per unit area in the optical fiber 33 is small, thus reducing the deterioration in its optical transmission characteristics caused by the occurrence of nonlinear optical phenomena as well. The same is true with the case where the signal light emitted from the light source 44 propagates to the receiver 53. As a result of the foregoing configuration, in the whole optical transmission line 300 in which the optical fibers 31 to 33 are cascaded to each other, the deterioration in its optical transmission characteristics caused by the occurrence of nonlinear optical phenomena is lowered in the signal light propagating in either direction.

Also, at the center wavelength, 1,550 nm, in the wavelength band in use (1,500 nm to 1,600 nm), the dispersion slope of each of the optical fibers 31 and 33 is greater than the dispersion slope of the optical fiber 32. Namely, though the dispersion slope of each of the optical fibers 31 and 33 must be made greater due to their enhanced effective area, the dispersion slope of the optical fiber 32 can be made smaller since its effective area is smaller than that of each of the optical fibers 31 and 33. The dispersion slope of the whole optical transmission line 300, in which the optical fibers 31 to 33 are cascaded to each other, is the weighted mean value of the respective dispersion slopes of the optical fibers 31 to 33 in terms of their lengths, thus being smaller than the dispersion slope of the optical transmission line made of the optical fiber 31 or 33 alone. The optical fiber 32 contributes to lowering the dispersion slope of the whole optical transmission line 300. Specifically, it is preferred that the dispersion slope of the whole optical transmission line 300 be not greater than 90% of that of the optical fiber 31 or 33. The same is true with wavelength dispersion.

Thus configured optical transmission line 300 can suppress influence of the deterioration in its optical transmission characteristics caused by each of the occurrence of nonlinear optical phenomena and the wavelength dispersion. Further, since the deterioration in its optical transmission characteristics can be reduced in the signal light propagating in either direction, the optical transmission line 300 according to the third embodiment is suitably used for bidirectional communications.

In the following, results of an experiment will be explained. At the signal light wavelength of 1,550 nm, values of effective area, dispersion slope, wavelength dispersion, and length in the optical fibers 31 to 33 were set as shown in the following Table 3. This table also shows the experimentally obtained values of dispersion slope and wavelength dispersion of the whole optical transmission line 300 in which the optical fibers 31 to 33 were cascaded to each other.

TABLE 3

|  | Fiber 31 | Fiber 32 | Fiber 33 | Whole line |
|---|---|---|---|---|
| Effective Area ($\mu m^2$) | 80 | 20 | 80 | — |
| Dispersion Slope ($ps/nm^2/km$) | 0.11 | 0.01 | 0.11 | 0.08 |
| Wavelength Dispersion ($ps/nm/km$) | −2.0 | −1.8 | −2.0 | −1.9 |
| Length (km) | 30 | 30 | 30 | — |

As shown in this table, the optical fibers 31 and 33 have an identical effective area and an identical dispersion slope, which are respectively greater than the effective area and dispersion slope of the optical fiber 32. The dispersion slope of the whole optical transmission line 300 is the weighted mean value of the respective dispersion slopes of the optical fibers 31 to 33 in terms of their lengths, whereas the wavelength dispersion of the whole optical transmission line 300 is the weighted mean value of the respective wavelength dispersions of the optical fibers 31 to 33 in terms of their lengths. Accordingly, the deterioration in its optical transmission characteristics in the whole optical transmission line 300 caused by wavelength dispersion has been reduced as compared with the case where the optical transmission line is made of the optical fiber 31 or 33 alone. In particular, the absolute value of wavelength dispersion in each of the optical fibers 31, 32, and 33 is not greater than 5 ps/nm/km.

The transmission loss in the front-end optical fiber 31 is 0.20 dB/km, whereby the power of the signal light transmitted through 30 km of the optical fiber 31 decreases by 6 dB. The transmission loss in the optical fiber 32 is also 0.20 dB/km, whereby the power of the signal light transmitted through 30 km of the optical fiber 32 further decreases by 6 dB. Accordingly, when the signal light emitted from the light source 43 propagates through the optical fiber 31 even with a high power, the deterioration in its optical transmission characteristics caused by the occurrence of nonlinear optical phenomena is reduced since the optical fiber 31 has a large effective area. On the other hand, when the signal light propagates through the optical fiber 32, though it has a small core cross-sectional area, the deterioration in its optical transmission characteristics caused by the occurrence of nonlinear optical phenomena is reduced since the power of the signal light is low. Further, when the signal light propagates through the optical fiber 33, since its effective area is large, and the power of the signal light is further lower, the deterioration in its optical transmission characteristics caused by the occurrence of nonlinear optical phenomena is reduced. Also, it has been confirmed that the deterioration in its optical transmission characteristics caused by the occurrence of nonlinear optical phenomena is small in the optical transmission line 300 as a whole. Similarly, it has been confirmed that the deterioration in its optical transmission characteristics caused by the occurrence of nonlinear optical phenomena is small when the signal light emitted from the light source 44 propagates to the receiver 53.

Figure 6A:
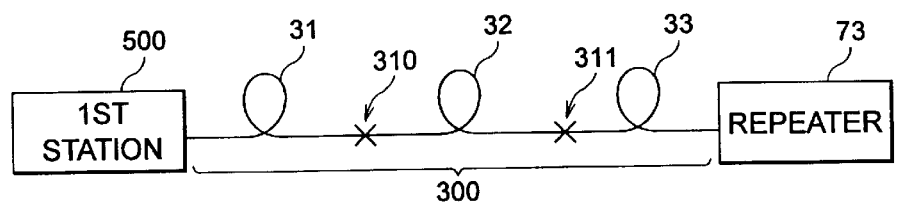
FIGS. 6A to 6D are views showing configurations of modified examples of the third embodiment of the optical transmission line according to the present invention.
Figure 6B:
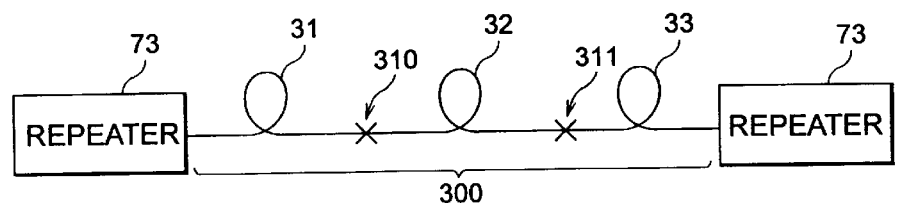
Figure 6C:
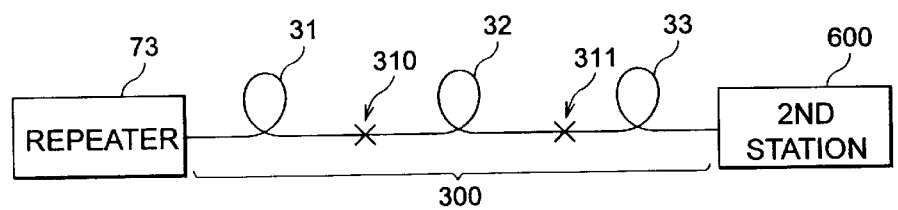

The optical transmission line 300 according to the third embodiment is not necessarily disposed between the first station 500 including the light source 43, receiver 53, and the like and the second station 600 including the light source 44, receiver 54, and the like. Similar effects can also be obtained when the optical transmission line 300 is disposed between the first station 500 and a repeater 73 such as optical amplifier as shown in FIG. 6A, between repeaters 73 as shown in FIG. 6B, or between the repeater 73 and the second station 600 as shown in FIG. 6C.

At a connecting point 310 of the optical fibers 31 and 32, and at a connecting point 311 of the optical fibers 32 and 33, the optical fibers 31, 32, and 33 can be connected to each other either by fusion or by way of a connector.

Figure 6D:
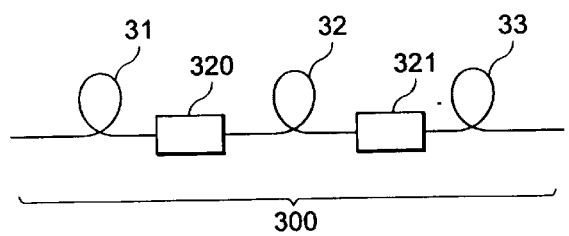

As long as the power of the signal light entered into the optical fiber 31 is greater than the power of the signal light entered into the optical fiber 32, similar effects can also be obtained in a configuration in which an optical device 320 having an optical amplification function is disposed between the optical fibers 31 and 32 as shown in FIG. 6D. Also, as long as the power of the signal light entered into the optical fiber 32 is greater than the power of the signal light entered into the optical fiber 33, it is possible to realize a configuration in which an optical device 321 having an optical amplification function is disposed between the optical fibers 32 and 33.

Though the number of optical fibers constituting the optical transmission line 200 is 3 in the second embodiment, a larger number of optical fibers can be cascaded to each other. Also in this case, the optical fiber having a larger effective area and a greater dispersion slope is connected closer to the light source.

As explained in detail in the foregoing, according to the present invention, even when the signal light propagating through the first optical fiber has a high power, the deterioration in its optical transmission characteristics caused by the occurrence of nonlinear optical phenomena is reduced since the first effective area is large. Also, since the signal light propagating through the second optical fiber after propagating through the first optical fiber lowers its power when propagating through the first optical fiber, the deterioration in its optical transmission characteristics caused by the occurrence of nonlinear optical phenomena is reduced even though the second effective area is small. Accordingly, the deterioration in its optical transmission characteristics caused by the occurrence of nonlinear optical phenomena is also reduced in the optical transmission line as a whole. Since the dispersion slope of the whole optical transmission line is the weighted mean value of the first and second dispersion slopes in terms of length, it is smaller than in the case where the first optical fiber is used alone. Consequently, the deterioration in its optical transmission characteristics caused by wavelength dispersion is also lowered.

When the second dispersion slope is not greater than ½ of the first dispersion slope, the dispersion slope of the whole optical transmission line sufficiently decreases.

In the configuration in which a third optical fiber having a third effective area larger than the second effective area and a third dispersion slope greater than the second dispersion slope is substantially cascaded to the second optical fiber, and the signal light propagates through the third optical fiber is made incident on and propagates through the second optical fiber, the first, second, and third optical fibers are cascaded to each other in this order. Accordingly, the deterioration in its optical transmission characteristics caused by each of the occurrence of nonlinear optical phenomena and the wavelength dispersion is reduced not only in the signal light propagating from the first optical fiber to the third optical fiber but also in the signal light propagating from the third optical fiber to the first optical fiber.

In the case where a predetermined number, not smaller than 3, of optical fibers, whose dispersion slope is greater as the effective area is larger, are substantially cascaded to each other in order of decreasing effective area, and the signal light successively propagates therethrough from the larger effective area side to the smaller effective area side, the signal light successively propagates through the optical fibers in order of decreasing effective area and dispersion slope. Consequently, the deterioration in its optical transmission characteristics caused by both the occurrence of nonlinear optical phenomena and wavelength dispersion is reduced. Further, in this case, since the effective areas and dispersion slopes of the predetermined number of cascaded optical fibers are configured so as to change stepwise, structural dissociation of optical fibers at each optical fiber connecting point can be reduced, thereby allowing the connection loss in the whole optical transmission line to be minimized.

Further, in the case where the absolute value of wavelength dispersion as a whole is not greater than 5 ps/nm/km in the 1.55-$\mu$m wavelength band, the wavelength dispersion of the whole optical transmission line becomes sufficiently small so that the deterioration in its optical transmission characteristics caused by wavelength dispersion can be sufficiently lowered. In particular, it is preferred that each of the optical fibers constituting the optical transmission line has a wavelength dispersion whose absolute value is not greater than 5 ps/nm/km.

As mentioned in the foregoing, in the optical transmission line according to the present invention, dispersion slope is greater in the optical fiber having a larger effective area, whereas it is smaller in the optical fiber having a smaller effective area. Accordingly, each of the optical fibers constituting the optical transmission line can be designed and manufactured easily. Namely, the optical transmission line capable of suppressing the deterioration in its optical transmission characteristics caused by each of the occurrence of nonlinear optical phenomena and the wavelength dispersion can be constructed inexpensively. Accordingly, the optical transmission line according to the present invention is suitably used for large-capacity long-haul communications by means of WDM transmission.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission line comprising:
   a first optical fiber having, as characteristics at a predetermined operating wavelength, a first effective area and a first dispersion slope; and
   a second optical fiber optically connected to said first optical fiber so as to let in the signal light that has propagated through said first optical fiber, said second optical fiber having, as characteristics at the predetermined operating wavelength, a second effective area smaller than said first effective area and a second dispersion slope, said second dispersion slope having an absolute value smaller than an absolute value of said first dispersion slope and having the same sign as said first dispersion slope.

2. An optical transmission line according to claim 1, wherein said second dispersion slope is not greater than ½ of said first dispersion slope.

3. An optical transmission line according to claim 1, wherein said first and second optical fibers each have a wavelength dispersion whose absolute value is not greater than 5 ps/nm/km at the predetermined operating wavelength.

4. An optical transmission line according to claim 1, wherein said optical transmission line as a whole has a wavelength dispersion whose absolute value is not greater than 5 ps/nm/km at the predetermined operating wavelength.

5. An optical transmission line according to claim 1, wherein the signal light incident on said first optical fiber has a power higher than the signal light incident on said second optical fiber.

6. An optical transmission line according to claim 1, wherein said second optical fiber functions such that said optical transmission line as a whole has a dispersion slope at the predetermined operating wavelength smaller than said first dispersion slope.

7. An optical transmission line according to claim 1, wherein said optical transmission line has a dispersion slope not greater than 90% of said first dispersion slope.

8. An optical transmission line according to claim 1, wherein said optical transmission line is disposed, at least, between a light source and a receiver, between a light source and a repeater, between repeaters, or between a repeater and a receiver.

9. An optical transmission line according to claim 1, further comprising:
   a third optical fiber optically connected to said second optical fiber so as to let in said signal light that has propagated through said second optical fiber, said third optical fiber having, as characteristics at the predetermined operating wavelength, a third effective area larger than said second effective area and a third dispersion slope greater than said second dispersion slope.

10. An optical transmission line according to claim 9, wherein said optical transmission line is disposed, at least, between first and second stations each including a light source and a receiver, between the first station and a repeater, between repeaters, or between a repeater and the second station.

11. An optical transmission line comprising a plurality of optical fibers disposed along a propagating direction of signal light;

wherein a first optical fiber of a pair of optical fibers selected from said plurality of optical fibers has, as characteristics at a predetermined wavelength, a first effective area and a first dispersion slope; and wherein a second optical fiber of the pair of optical fibers selected from said plurality of optical fibers is disposed so as to let in the signal light that has propagated through said first optical fiber, said second optical fiber having, as characteristics at the predetermined operating wavelength, a secon effective area smaller than said first effective area and a second dispersion slope, said second dispersion slope having an absolute value smaller than an absolute value of said first dispersion slope and having the same sign as said first dispersion slope.

12. An optical transmission line according to claim 11, wherein said plurality of optical fibers each have a wavelength dispersion whose absolute value is not greater than 5 ps/nm/km at the predetermined operating wavelength.

13. An optical transmission line according to claim 11, wherein said optical transmission line as a whole has a wavelength dispersion whose absolute value is not greater than 5 ps/nm/km at the predetermined operating wavelength.

14. An optical transmission line comprising:

a first optical fiber having, as characteristics at a predetermined operating wavelength, a first effective area, a first dispersion slope, and a wavelength dispersion whose absolute value is not greater than 5 ps/nm/km; and a second optical fiber optically connected to said firs optical fiber so as to let in the signal light that has propagated through said first optical fiber, said second optical fiber having, as characteristics at the predetermined operating wavelength, a second effective area smaller than said first effective area, a second dispersion slope, said second dispersion slope having an absolute smaller than an absolute value of said first dispersion slope and having the same sign as said first dispersion slope, and a wavelength dispersion whose absolute value is not greater than 5 ps/nm/km.

15. An optical transmission line according to claim 14, wherein said second dispersion slope is not greater than ½ of said first dispersion slope.

16. An optical transmission line according to claim 14, wherein said optical transmission line as a whole has a wavelength dispersion whose absolute value is not greater than 5 ps/nm/km at the predetermined operating wavelength.

17. An optical transmission line according to claim 14, wherein the signal light incident on said first optical fiber has a power higher than the signal light incident on said second optical fiber.

18. An optical transmission line according to claim 14, wherein said second optical fiber functions such that said optical transmission line as a whole has a dispersion slope at the predetermined operating wavelength smaller than said first dispersion slope.

19. An optical transmission line according to claim 14, wherein said optical transmission line has a dispersion slope not greater than 90% of said first dispersion slope.

20. An optical transmission line according to claim 14, wherein said optical transmission line is disposed, at least, between a light source and a receiver, between a light source and a repeater, between repeaters, or between a repeater and a receiver.

21. An optical transmission line according to claim 14, further comprising:

a third optical fiber optically connected to said second optical fiber so as to let in said signal light that has propagated through said second optical fiber, said third optical fiber having, as characteristics at the predetermined operating wavelength, a third effective area larger than said second effective area, a third dispersion slope greater than said second dispersion slope, and a wavelength dispersion whose absolute value is not greater than 5 ps/nm/km.

22. An optical transmission line according to claim 21, wherein said optical transmission line is disposed, at least, between first and second stations each including a light source and a receiver, between the first station and a repeater, between repeaters, or between a repeater and the second station.

23. An optical transmission line according to claim 14, further comprising:

a third optical fiber optically connected to said second optical fiber so as to let in said signal light that has propagated through said second optical fiber, said third optical fiber having, as characteristics at the predetermined operating wavelength, a third effective area smaller than said second effective area, a third dispersion slope smaller than said second dispersion slope, and a wavelength dispersion whose absolute value is not greater than 5 ps/nm/km.

24. An optical transmission line according to claim 23, wherein said optical transmission line is disposed, at least, between a light source and a receiver, between a light source and a repeater, between repeaters, or between a repeater and a receiver.

25. A WDM optical transmission line, comprising:

a first optical fiber having a first effective area and a first dispersion slope; and a second optional fiber through which a signal light that has propagated through said first optical fiber propagates, said second optical fiber having a second effective area smaller than said first effective area and a second dispersion slope, said second dispersion slope having an absolute value smaller than an absolute value of said first dispersion slope and having the same sign as said first dispersion slope.

26. A WDM optical transmission line according to claim 25, wherein said second dispersion slope is not greater than ½ of said first dispersion slope.

27. A WDM optical transmission line according to claim 25, further comprising:

a third optical fiber having a third effective area in a region between said first and second effective areas and a third dispersion slope in a region between said first and second dispersion slope, wherein said third optical fiber interposed between said first optical fiber and said second optical fiber such that the signal light propagates through, in order, the first optical fiber, the third optical fiber and the second optical fiber.

28. A WDM optical transmission line according to claim 25, wherein each of said first and second fibers has a wavelength dispersion with an absolute value not greater than 5 ps/nm/km.

29. A WDM optical transmission line comprising:
a first optical fiber having a first effective area and a first dispersion slope; and
a second optical fiber having a second effective area smaller than said first effective area and a second dispersion slope said second dispersion slope having an absolute value smaller than an absolute value of said first dispersion slope having the same sign as said first dispersion slope,
wherein, as a whole, said WDM optical transmission line restrains optical transmission characteristics from deteriorating due to occurence of nonlinear optical phenomena by changing an effective area of said whole optical transmission line with intensity reduction of a signal light and reducing optical energy in a unit of sectional area of said first and second optical fibers.

30. A WDM optical transmission line according to claim 29, wherein said first optical fiber is disposed at a tip portion of said WDM optical transmission line which includes a light incident end face of said WDM optical transmission lines.

31. A WDM optical transmission line according to claim 29, wherein each of said first and second fibers has a wavelength dispersion with an absolute value not greater than 5 ps/nm/km.

32. A bidirectional WDM optical transmission line, comprising:
a first optical fiber having a first effective area and a first dispersion slope;
a second optical fiber having a second effective area and a second dispersion slope; and
a third optical fiber having a third effective area and a third dispersion slope,
wherein said second effective area is smaller than said first and third effective areas and said second dispersion slope, said second dispersion slope having an absolute value which is smaller than absolute values of said first and third dispersion slopes, and wherein each of the first, second and third dispersion slopes have the same sign; and
wherein said second optical fiber is disposed between said first and third optical fibers, whereby a signal light propagates in order from said first optical fiber toward said third optical fiber or from said third optical fiber toward said first optical fiber.

33. An optical transmission line comprising a plurality of optical fibers disposed along a propagating direction of signal light;
wherein a second optical fiber selected from said plurality of optical fibers has, as characteristics at a predetermined operating wavelength, a first effective area and a first dispersion slope;
wherein a second optical fiber selected from said plurality of optical fibers is disposed so as to let in the signal light that has propagated through said first optical fiber, said second optical fiber having, as characteristics at the predetermined operating wavelength, a second effective area smaller than said first effective area and a second dispersion slope, said second dispersion slope having an absolute value smaller than an absolute value of said first dispersion slope and said dispersion slope is of the same sign as said first dispersion slope; and
wherein the second dispersion slope of said second opticl fiber is a value such that a dispersion slope of a transmission line defined by said first and second optical fibers is reduced to be not greater than 90% of the first dispersion slope of said first optical fiber.

34. An optical transmission line according to claim 33, whereinsaid optical transmission line is disposed, at least, between first and second stations each including a light source and a receiver, between the first station and a repeater, between repeaters, or between a repeater and the second station.

35. An optical transmission line comprising:
a first optical fiber having, as characteristics at a predetermined operating wavelength, a first effective area, a first dispersion and a first dispersion slope; and
a second optical fiber optically connected to said optical fiber so as to let in the signal light that has propagated through said first optical fiber, said second optical fiber having, as characteristics at the predetermined operating wavelength, a second effective area smaller than said first effective area, a second dispersion and a secons dispersion slope having an absolute value which is smaller than an absolute value of said first dispersion slope,
wherein said first dispersion slope and said second dispersion slope are each positive,
said first dispersion and said second dispersion are each negative,
said first dispersion slope is defined as a gradient of a first dispersion curve with respect to wavelength,
and said second dispersion slope is defined as a gradient of a second dispersion curve with respect to wavelength.

36. An optical transmission line according to claim 35 wherein each of said first and second fibers has a wavelength dispersion with an absolute value no greater than 5 ps/nm/km.

37. A method of configuring a WDM optical transmission line, comprising the steps of:
preparing a first optical fiber having a first effective area and a first dispersion slope;
preparing a second optical fiber having a second effective area smaller than said first effective area and a second dispersion slope, said second dispersion slope having an absolute value smaller than an absolute value of said first dispersion slope and having the same sign as said first dispersion slope; and
arranging said first and second optical fiber such that a signal light propagates through in order from said first optical fiber toward said second optical fiber.

38. A method according to claim 37, wherein, as a whole, said WDM optical transmission line restrains optical transmission characteristics from deteriorating due to occurrence of a nonlinear optical phenomena by changing an effective area of said whole WDM optical transmission line with intensity reduction of a signal light and reducing optical energy in a unit of sectional area of said first and second optical fibers, and
wherein said second dispersion slope sufficiently reduces a dispersion slope of said whole bidirectional WDM optical transmission line.

39. A method of configuring a WDM optical transmission line according to claim 37, wherein each of said first and second fibers has a wavelength dispersion with an absolute value not greater than 5 ps/nm/km.

* * * * *

UNITED STATES PATENT AND TRADEMARK OFFICE
CERTIFICATE OF CORRECTION

PATENT NO. : 6,157,754
DATED : December 5, 2000
INVENTOR(S) : Sasaoka et al.

Page 1 of 1

It is certified that error appears in the above-identified patent and that said Letters Patent is hereby corrected as shown below:

Column 17,
Line 50, (claim 33, line 4), change "second" to -- first --.

Column 18,
Line 20, (claim 35, line 11), change "secons" to -- second --.

Signed and Sealed this

Sixth Day of November, 2001

Attest:

NICHOLAS P. GODICI
Attesting Officer  *Acting Director of the United States Patent and Trademark Office*